Sept. 8, 1931.  W. N. BOOTH  1,821,926
WORK CHUCK
Filed May 23, 1927
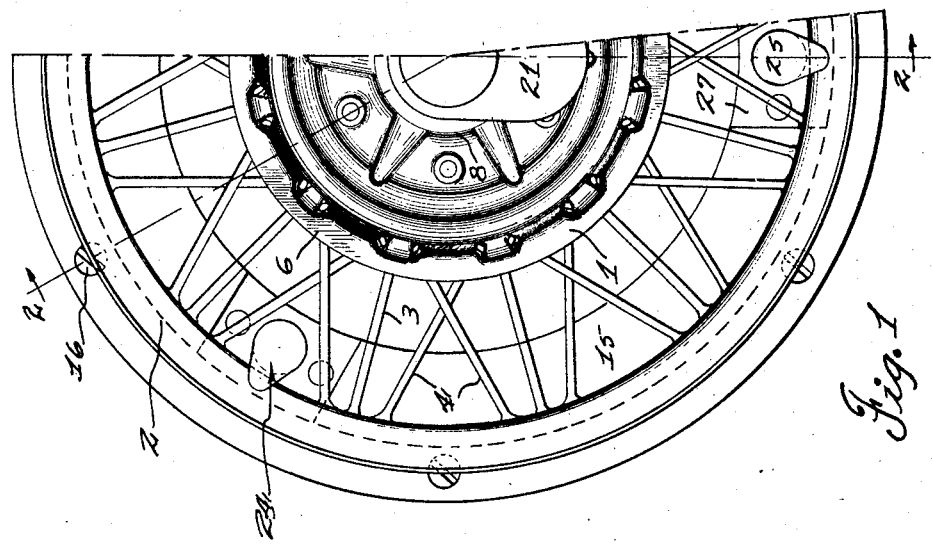
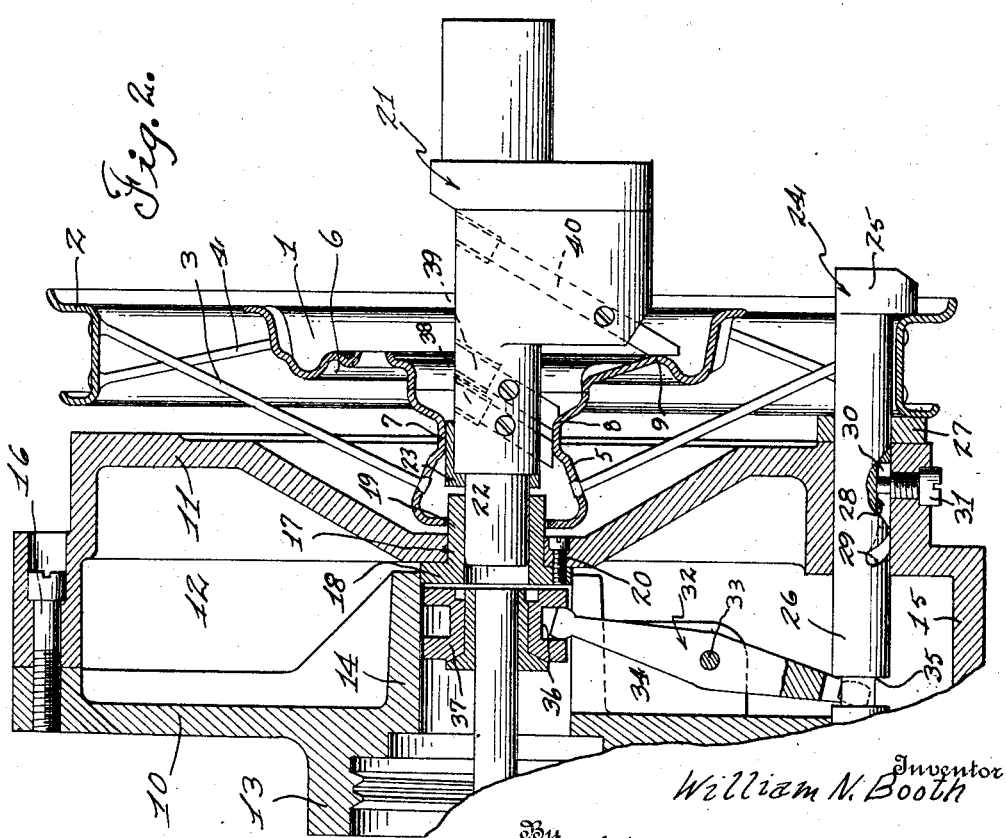
Inventor
William N. Booth Patented Sept. 8, 1931

1,821,926

UNITED STATES PATENT OFFICE

WILLIAM N. BOOTH, OF DETROIT, MICHIGAN, ASSIGNOR TO KELSEY-HAYES WHEEL CORPORATION, OF DETROIT, MICHIGAN, A CORPORATION OF NEW YORK

WORK CHUCK

Application filed May 23, 1927. Serial No. 193,693.

The invention relates to work chucks and refers more particularly to chucks for vehicle wire wheels. One of the objects of the invention is to so construct the chuck that a wheel can be readily inserted or removed. Another object is to provide for accurately locating a wheel relative to the chuck so that the wheel may be accurately machined. Other objects of the invention reside in the novel features of construction and combinations and arrangements of parts as more fully hereinafter set forth.

In the drawings:—

Figure 1 is an end view partly broken away showing a chuck with the vehicle wire wheel secured thereto;

Figure 2 is a cross section on the line 2—2 of Figure 1.

The chuck, as illustrated, is designed particularly to hold a wire wheel for a motor vehicle while the hub shell of this wheel is being machined. The wheel in the present instance has the hub shell 1, the rim 2 which is a channel-shaped felly, and the front and rear sets of spokes 3 and 4 connecting the hub shell to the rim. The hub shell is formed of sheet metal and has the barrel 5 and the radially extending flange 6, the front spokes being connected to the barrel and the rear spokes to the flange. The barrel has the annular depression 7 intermediate its ends which is adapted to slidably engage over the barrel of the wheel hub and which forms the rearwardly facing annular flared shoulder 8 for engaging a corresponding shoulder upon the barrel of the wheel hub. The flange has the concentric annular rib 9, the rear face of which is adapted to contact with the fixed flange of the wheel hub.

It is essential that the hub shell properly engage the wheel hub and that the rim run true and to secure this result the rear face of the annular rib 9 and the face of the annular shoulder 8 of the hub shell must be properly located relative to each other and their planes of rotation must be parallel to the plane of rotation of the rim. Furthermore, the inner face of the annular depression 7 of the hub shell must be concentric of the wheel and extend at right angles to its plane of rotation. To make sure that these faces are correct, the wheel is inserted into the chuck embodying my invention and a cutter holder carrying a cutter for each face is advanced to bring these cutters into engagement with the work, if any machining is required. The chuck head is rotatable and comprises the body 10 and the cover 11 which together form a chamber 12. The body has the hub 13 which is suitably secured to a rotatable hollow driving shaft and the boss 14 which extends toward the cover within the chamber. The cover has the peripheral cylindrical flange 15 which is suitably secured to the body as by means of the screws 16. 17 is a bushing having the annular flange 18 fitting in the front end of the boss 14 and the barrel 19 extending through the cover 11, the bushing being preferably secured to the cover as by means of the screws 20.

21 is the cutter holder which is movable axially of the chuck head and has the reduced end 22 for slidably fitting within the bushing 19 whereby alignment of the cutter holder relative to the chuck head is assured. This cutter holder also carries the bushing 23 which is of greater diameter than the reduced end 22 and slidably engages the inner face of the annular depression 7 of the hub shell. With this arrangement, the bushings 17 and 23 constitute pilots for assuring concentric location of the hub shell and consequently the wheel relative to the chuck head.

For clamping the wheel to the chuck head, I have provided the clamps 24 each comprising the head 25 and rod 26 extending transversely of and slidably engaging the body 10 and cover 11. These clamps are rotatable from positions clearing the rim to positions registering with the rim and are also longitudinally movable to bring their heads into clamping engagement with the rim and to clamp the rim to the chuck head. In the present instance abutment plates 27 are provided for engaging the front flange of the rim, these abutment plates being rigidly secured to the cover 11. To provide for rotating each clamp, its rod 26 has the cam groove 28 with the spiral portion 29 inclined relative to the axis of the rod and the straight portion 30 extending parallel to the axis of the rod, this cam groove being engageable by the reduced end of the screw 31 threaded into the cover 11. For actuating the clamps simultaneously, I have provided the rock levers 32 which are pivotally mounted at 33 upon the bifurcations 34 of the body 10. These levers are located within the chamber 12 and have their outer ends engageable in the annular grooves 35 in the rods and their inner ends engageable in the annular groove 36 in the collar 37. This collar slidably engages the boss 14 and is secured to a suitable piston rod extending through the hollow driving shaft and connected to a piston within an air cylinder or the like. With this arrangement and with the parts as shown in Figure 2, it will be seen that movement of the collar 37 away from the cover 11 and bushing 17 rocks the levers 32 which longitudinally move their respective clamps 24. During the first portion of the movement, the clamp rods move rectilinearly and during the latter portion they rotate and swing the clamp heads to positions clearing the rim.

38, 39 and 40 are cutters carried by the cutter holder 21 and respectively engageable with the inner face of the annular depression 7, the face of the annular shoulder 8 and the rear face of the annular rib 9 of the hub shell, these cutters being so positioned and located and the cutter holder being movable toward the chuck head a predetermined distance to properly machine these faces and true up the same, if required.

To mount the wheel in the chuck the wheel is first approximately positioned relative to the chuck head and then the cutter holder is advanced to bring its bushing or pilot 23 into engagement with the annular depression 7 of the hub shell, the advance, however, being such that the cutters do not engage the hub shell. The collar 37 is then pushed forward to the position shown in Figure 2 and compels the clamps to first swing brings their heads into registration with the rim of the wheel and then to move longitudinally bringing their heads into clamping engagement with the rim and clamping the rim against the abutment blocks upon the chuck head. The cutter holder is then advanced to make sure that the various locating faces of the hub shell are true.

What I claim as my invention is:
1. In a work chuck, the combination with a head including a body portion and a cover cooperating with the body to form a chamber, of a bushing carried by the cover and having a portion engageable in an aperture formed in the body portion for centering the cover relative to the body portion and having another portion engageable with a cutter holder and forming a pilot therefor, and means for clamping the work to the head including members arranged within the chamber aforesaid.

2. In a work chuck, the combination with a head having a body portion provided with a centrally arranged apertured boss, of a member arranged in juxtaposition to the body portion having an aperture in alignment with the aperture in the boss and cooperating with the body to form a chamber, a bushing arranged within the aperture in said member having a portion engageable in said boss for centering the member relative to the body portion, and having another portion engageable with a cutter holder forming a pilot therefor, and means associated with the cutter holder for locating the work relative to the head.

In testimony whereof I affix my signature.

WILLIAM N. BOOTH.